US011882823B2

(12) United States Patent
Post et al.

(10) Patent No.: US 11,882,823 B2
(45) Date of Patent: Jan. 30, 2024

(54) COMPOSITION AND METHOD OF USE OF THE SAME FOR PRESERVING CELLS FOR ANALYSIS

(71) Applicant: Chryos, LLC, Lincoln, NE (US)

(72) Inventors: Gregory R. Post, Lincoln, NE (US); David Adle, Fishers, IN (US)

(*) Notice: Subject to any disclaimer, the term of this patent is extended or adjusted under 35 U.S.C. 154(b) by 577 days.

(21) Appl. No.: 16/479,392

(22) PCT Filed: Jan. 19, 2018

(86) PCT No.: PCT/US2018/014446
§ 371 (c)(1),
(2) Date: Jul. 19, 2019

(87) PCT Pub. No.: WO2018/136751
PCT Pub. Date: Jul. 26, 2018

(65) Prior Publication Data
US 2019/0357526 A1 Nov. 28, 2019

Related U.S. Application Data

(60) Provisional application No. 62/449,076, filed on Jan. 22, 2017.

(51) Int. Cl.
A01N 1/02 (2006.01)

(52) U.S. Cl.
CPC ......... A01N 1/0221 (2013.01); A01N 1/0215 (2013.01); A01N 1/0284 (2013.01)

(58) Field of Classification Search
None
See application file for complete search history.

(56) References Cited

U.S. PATENT DOCUMENTS

| | | | | |
|---|---|---|---|---|
| 3,632,735 A | * | 1/1972 | Kita | G01N 33/49 436/17 |
| 4,806,343 A | * | 2/1989 | Carpenter | A61K 9/19 435/188 |
| 5,858,699 A | * | 1/1999 | Granger | G01N 33/96 435/40.51 |
| 6,197,540 B1 | | 3/2001 | Granger et al. | |
| 6,579,672 B1 | * | 6/2003 | Granger | G01N 33/5094 435/2 |
| 8,900,864 B2 | | 12/2014 | Prante et al. | |
| 10,966,421 B2 | | 4/2021 | Ryan | |
| 2002/0119507 A1 | * | 8/2002 | Kishimoto | C12N 9/0008 435/26 |
| 2017/0137805 A1 | * | 5/2017 | Pugia | C12Q 1/6806 |

FOREIGN PATENT DOCUMENTS

| | | |
|---|---|---|
| AU | 2003254755 | 5/2004 |
| CA | 2445204 | 4/2004 |
| EP | 0721104 A2 | 7/1996 |
| EP | 0721104 A3 | 8/1996 |
| EP | 0754301 | 1/1997 |
| EP | 0906568 | 4/1999 |
| EP | 1816461 | 8/2007 |
| EP | 3118623 | 1/2017 |

OTHER PUBLICATIONS

EPO Extended European Search Report dated Oct. 21, 2020 for EP Patent Application No. 18741530, including the European Search Opinion and Supplementary European Search Report completed Oct. 8, 2020, 5 pages.
Mathur Nadarajan Kathiravan et al: "bioremediation of Cr(VI) contaminated soil bysp.: Batch and continuous studies", Chemical Engeneering Journal, Elsevier, Amsterdam, NL, vol. 169, No. 1, Feb. 24, 2011 (Feb. 24, 2011), pp. 107-115, XP028200063, ISSN: 1385-8947, DOI: 10.1016/J.CEJ.2011.02.060 [retrieved on Mar. 2, 2011].
EPO, Communication Under Rule 71(3) for 18741530.2 application, Intention to Grant, dated Apr. 6, 2022, 5 pages.
IB, International Search Report, dated May 15, 2018, 2 pages.
CytoChex BCT Online Brochure, Jan. 21, 17 (accessed Aug. 7, 2022 https://www.streck.com/products/flow-cytometry/cyto-chex-bct/#resources) 12 pages.
CytoMark BCT Online Brochure, Jan. 21, 17 (accessed Aug. 7, 2022 https://www.cytomark.co.uk/sample-stabilisation/blood/) 15 pages.
International Bureau, Written Opinion of International Search Authority, dated May 15, 2018, 8 pages.
Pinto et al., Fixation and Cryopreservation of Whole Blood and Isolated Mononuclear Cells: Influence of Different Procedures on Lymphocyte Subset Analysis by Flow Cytometry, Cytometry Part B (Clinical Cytometry), 63B:47-55 (2005) (9 pages).
SmartTube Brochure, Dec. 3, 2016 (3 pages).
Nemes et al., Differential Leukocyte Counting and Immunophenotyping in Cryopreserved Ex Vivo Whole Blood, Cytometry Part A, 87A:157-165 (2015), 9 pages.
CytoChex BCT Instructions for Use, Jan. 21, 17 (accessed Aug. 8, 22, https://www.streck.com/wp-content/uploads/sync/Flow_Cytometry/Cyto-Chex_BCT/01_Instructions_(IFU)/01_Cyto-Chex_BCT_IFU.pdf), 13 pages.
Transfix Online Brochure, Jan. 21, 17 (accessed Aug. 8, 22 https://www.cytomark.co.uk/transfix), 8 pages.
BD Stem Cell Control CD34+, Jan. 21, 2017 (accessed Aug. 8, 2022, https://www.bdbiosciences.com/content/dam/bdb/products/global/reagents/flow-cytometry-reagents/clinical-diagnostics/multicolor-cocktails-and-kits-ivd-ce-ivds/340991_base/pdf/23-4896.pdf), 5 pages.

(Continued)

Primary Examiner — Allison M Fox
(74) Attorney, Agent, or Firm — Baird Holm LLP

(57) ABSTRACT

Stabilizing compositions for stabilizing a post-draw, but pre-analysis sample include, a saccharide, at least one heavy metal salt, and a pH from 5.9 to 8.0. The stabilizing compositions may include an aliphatic aldehyde, a buffer, and a preservative. The stabilizing compositions stabilize a sample for analysis. The analysis preformed on the stabilized cell may determine the state of a condition of interest, quantification of absolute cell counts, cellular activity, and qualitative analysis of cell types. Stabilizing a sample means that cells of the sample retain their biophysical properties, including biophysical properties of cell surface markers, for analysis. Preferably, the stabilizing compositions and methods may stabilize a sample for at least 16 days, and up to 30 days. The stabilizing compositions and methods may stabilize a sample for up to 180 days.

8 Claims, 10 Drawing Sheets

(56) References Cited

OTHER PUBLICATIONS

Danaei, National, regional, and global trends in fasting plasma glucose and diabetes prevalences since 1980: systematic analysis of health examination surveys and epidemiological studies with 370 country-years and 2.7 million participants, www.thelancet.com vol. 378 pp. 31-40(Jul. 2, 2011), 10 pages.

\* cited by examiner

First Aliquot (Control)

Second Aliquot (Day 50)

Third Aliquot (Day 5)

Second Aliquot (Stabilizing Composition)

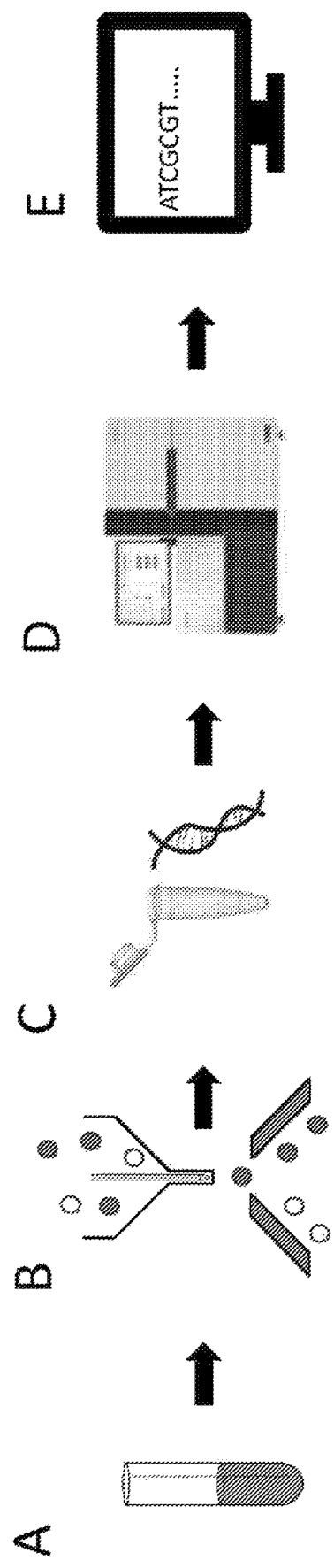

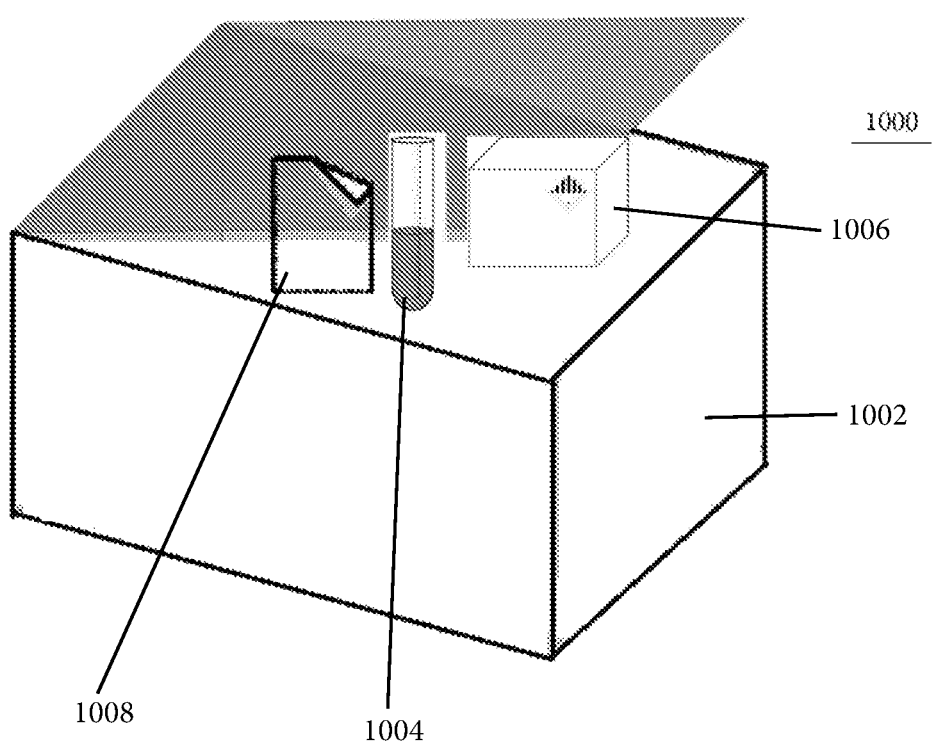

COMPOSITION AND METHOD OF USE OF THE SAME FOR PRESERVING CELLS FOR ANALYSIS

REFERENCE TO RELATED APPLICATIONS

This application is national stage entry under 35 U.S.C. § 371(f) of PCT/US18/14446 entitled "COMPOSITION AND METHOD OF USE OF THE SAME FOR PRESERVING CELLS FOR ANALYSIS" filed Jan. 19, 2018, which claims the benefit of priority to U.S. Provisional Patent Application No. 62/449,076 filed Jan. 22, 2017, entitled "COMPOSITION AND METHOD OF USE OF THE SAME FOR PRESERVING CELLS FOR ANALYSIS", which are both incorporated by reference in their entirety.

BACKGROUND

Preservation of biological specimens that are post-draw, but pre-analysis (a sample) is often necessary for analysis of cellular components. A sample, may be any biological specimen of human or animal origin that contains cells, such as whole blood, bone marrow aspirate, tissue, fine needle aspirates, and cord blood. Cells of hematopoietic origin (hematopoietic stem cells, leukocytes, and the like) and cells of non-hematopoietic origin (e.g. circulating tumor cells, circulating endothelial cells, and the like) are utilized for a wide variety of applications in research, and in clinical and drug development fields. Detection of specific epitopes on the cell surface (cell surface markers) is a common analysis method used to determine cell types, evaluate immunological states, cell differentiation, cell activation, drug effects and other cellular responses. Stabilization of cell surface markers in a sample allows for a period of time to pass before analysis of the sample occurs.

Flow cytometry is a conventional method for cell surface marker analysis. Flow cytometry can provide rapid, quantitative, and objective analysis of multiple parameters of a single cell simultaneously. Flow cytometry relies on fluorescent antibodies (antibody-fluorochrome conjugates) to label cell surface markers for cellular analysis. Cells can be classified by absence and/or presence of specific cell surface markers. In particular, cell surface markers may be categorized as classification determinants (CD) markers, where each CD marker is recognized by a specific antibody-fluorochrome conjugate. However, in order for flow cytometry to be used for analysis that takes place a period of time after the sample is collected, cell surface markers must have their physiological state maintained (stabilized).

Conventional stabilization methods for cell surface markers typically contain harsh fixatives, including high concentrations (e.g. greater than 0.15 Molar (M)) of aliphatic aldehydes or formaldehyde-releasing compounds that can crosslink and denature proteins and other cellular components. This cross-linking or denaturation can mask epitopes required for cell surface marker analysis. Typically, as the amount of time a sample is exposed to an aliphatic aldehyde or formaldehyde-releasing compound increases, the more cross-linking and denaturation occurs. This limits the amount of time that cell surface markers are stable for accurate analysis.

Conventional methods may stabilize cell surface markers for lymphocytes (e.g. CD3, CD4, CD8, CD16, CD19, CD56) for up to fourteen days. These cell surface markers are typically used for basic immunophenotyping. Further, conventional stabilization methods for more complicated analysis, for example analysis of markers required for defining subtypes of cells of hematopoietic origin, such as T-cell subtypes (e.g. CD45RA, CD45RO, CD197, CD62L, etc.), are not available, as these cell surface markers must be analyzed within 6 to 48 hours of sample draw. Further, for stem cells of hematopoietic origin, conventional methods provide for analysis of a sample within 12-24 hours of being drawn. The limited ability to stabilize diverse cell surface markers on cells of hematopoietic origin and of non-hematopoietic origin limits the ability to further analyze cell types of interest.

Presently, there are logistical and practical constraints on sample analysis that prolong the time before a sample is analyzed. For example, there are significant logistical issues for transportation of samples sent from areas without analysis capabilities (e.g. rural areas, sites participating in clinical trials) to central laboratories for analysis that increase the transportation time, prolonging the time before a sample is analyzed. This increased transportation time reduces the amount of time a sample is available for accurate analysis once at the central laboratory, or may, in some cases, eliminate the ability to analyze particular cell surface markers.

Practical considerations make it advantageous to batch samples for analysis at different times. For example, in drug development flow cytometry is used to monitor in vivo drug effects during clinical trials. In this instance, batching of large sample volumes and long-term storage (e.g. at least 30 days) for analysis and if necessary for re-analysis, is preferred.

Further, another practical consideration is the need for positive controls to identify a disease state. A positive control is a sample that has the cell surface marker of a particular disease state. In clinical diagnostics, cell surface markers that could identify a disease state are lacking for appropriate positive controls.

Finally, conventional methods of stabilizing and storing samples typically include the use of dimethyl sulfoxide (DMSO). For example, purification of peripheral blood mononuclear cells (PBMCs) by density gradient centrifugation and cryopreservation with DMSO is a conventional method to achieve long-term stabilization of markers for flow cytometry analysis. PBMC processing requires special equipment, technical skill and additional washing steps to remove DMSO for optimal staining. PBMC processing with DMSO requires technical skill and specialized equipment, which introduces sample variation. Therefore direct antibody staining of whole blood is preferred for flow cytometry analysis in order to obtain reproducible results.

It would be desirable to have a composition and method that stabilizes cell surface markers of cells for a period from 1 day (24 hours) up to 30 days. Further, it is desirable to have a composition and method that stabilizes cell surface markers on different populations of cells, such as cells of hematopoietic origin (e.g. leukocytes), and cells of non-hematopoietic origin (e.g. circulating tumor cells, endothelial cells). It is further desirable to have a stabilizing composition that stabilizes cell surface markers capable of differentiating populations and subpopulations of a particular cell population, such as granulocytes, monocytes, and lymphocytes within the leukocyte cell population. It is also desirable to have a stabilizing composition with an aliphatic aldehyde at a low concentration (e.g. 0.15 (M) and less) to reduce cross-linking of surface markers, which increases the stability of cell surface markers and allows for detection of markers sensitive to fixation. It is also desirable to have a method for analysis of biological specimens that does not include the addition of dimethyl sulfoxide (DMSO) to allow direct analysis of the specimen without additional technical steps (e.g. centrifugation).

SUMMARY

Biological specimen stabilizing compositions and methods of use are described. In one aspect of the invention a biological specimen stabilizing composition for stabilizing a post-draw biological specimen prior to analysis, includes a heavy metal salt, having an atomic number from 20 to 60, a saccharide, a pH from 5.9 to 8.0, and a solvent.

In another aspect of the invention the composition includes the composition of the paragraph [0009], wherein the heavy metal salt is chromium III chloride and manganese II chloride.

In another aspect of the invention the composition includes the composition of the paragraph [0010], wherein the chromium III chloride concentration in the composition is from 0.0002 to 0.1 Molar, and the manganese II chloride concentration in the composition is from 0.0001 to 0.1 Molar.

In another aspect of the invention the composition includes the composition of the paragraph [0009], wherein the saccharide is fructose.

In another aspect of the invention the composition includes the composition of the paragraph [0012], wherein the fructose concentration in the composition is from 1.5 to 3.0 Molar.

In another aspect of the invention the composition includes the composition of the paragraph [0009], further includes an aliphatic aldehyde concentration in the composition from 0.001 to 0.15 Molar.

In another aspect of the invention the composition includes the composition of the paragraph [0014], wherein the aliphatic aldehyde is formaldehyde.

In another aspect of the invention the composition includes the composition of the paragraph [0014], further including a bacterial growth inhibiting preservative.

In another aspect of the invention the composition includes the composition of the paragraph [0016], wherein the preservative is sodium azide having a concentration from 0.005 to 0.02% (weight/volume) in the composition.

In another aspect of the invention the composition includes the composition of the paragraph [0016], further including an aqueous buffer selected from the group consisting of 4-(2-hydroxyethyl)-1-piperazineethanesulfonic acid, 3-morpholinopropane-1-sulfonic acid (MOPS), 2-(N-morpholino)ethanesulfonic acid (MES), and combinations thereof, where the concentration of the aqueous buffer in the composition provides the composition the pH from 5.9 to 8.0.

In another aspect of the invention the composition includes the composition of the paragraph [0018], wherein the heavy metal salt is a combination of chromium III chloride having a 0.03 Molar concentration in the composition and manganese II chloride having a 0.02 Molar concentration in the composition; the saccharide is fructose having a 2.6 Molar concentration in the composition; the aqueous buffer is 4-(2-hydroxyethyl)-1-piperazineethanesulfonic acid at a concentration in the composition providing the composition a pH from 7.0 to 7.4; the aliphatic aldehyde is formaldehyde having a 0.1 Molar concentration in the composition; the preservative is sodium azide having a concentration in the composition of 0.01% (weight/volume).

In another aspect of the invention the composition includes the composition of the paragraph [0009], wherein the composition is contacted with a sample that is frozen.

In another aspect of the invention a method for stabilizing a biological specimen post-draw and prior to analysis, the method including, contacting a biological specimen with a stabilizing composition, the stabilizing composition including, a heavy metal salt, a saccharide, a pH from 5.9 to 8.0, and a solvent; storing the biological specimen contacted with the stabilizing composition at a temperature from minus 20 degrees Celsius to minus 200 degrees Celsius for at least 1 day to stabilize the biological specimen.

In another aspect of the invention a method for stabilizing and analyzing a biological specimen post-draw, the method including, contacting a biological specimen with a stabilizing composition, the stabilizing composition including, a heavy metal, a saccharide, a pH from 5.9 to 8.0, and a solvent; storing the biological specimen contacted with the stabilizing composition at a temperature from minus 20 degrees Celsius to minus 200 degrees Celsius for at least 1 day to stabilize the biological specimen; thawing the biological specimen contacted with the stabilizing composition; staining the biological specimen contacted with the stabilizing composition; lysing red blood cells in the biological specimen contacted with the stabilizing composition; analyzing the biological specimen to determine the presence or absence of a condition of interest.

In another aspect of the invention, the method of paragraph [0022], wherein the stabilizing composition further includes an aliphatic aldehyde; an aqueous buffer selected from the group consisting of 4-(2-hydroxyethyl)-1-piperazineethanesulfonic acid, 3-morpholinopropane-1-sulfonic acid (MOPS), 2-(N-morpholino)ethanesulfonic acid (MES), and combinations thereof, at a concentration in the composition providing the composition a pH from 5.9 to 8.0, and a preservative.

In another aspect of the invention, the method of paragraph [0023], wherein the heavy metal salt is chromium III chloride having a concentration of 0.03 M in the composition and manganese II chloride having a concentration of 0.02 Molar in the composition; the saccharide is fructose having a concentration of 2.6 Molar in the composition; the aqueous buffer is 4-(2-hydroxyethyl)-1-piperazineethanesulfonic acid at a concentration in the composition providing the composition a pH from 7.0 to 7.4; the aliphatic aldehyde is formaldehyde having a concentration of 0.1 Molar in the composition; and the preservative is sodium azide having a concentration in the composition of 0.01% (weight/volume).

In another aspect of the invention, the method of paragraph [0022], wherein the storing is for at least 30 days.

In another aspect of the invention, a method for stabilizing and analyzing a biological specimen post-draw, the method including contacting a biological specimen with a stabilizing composition, the stabilizing composition comprising a heavy metal, a saccharide, a pH from 5.9 to 8.0, and a solvent; storing the biological specimen contacted with the stabilizing composition at a temperature from minus 20 degrees Celsius to minus 200 degrees Celsius for at least 1 day to stabilize the biological specimen; thawing the biological specimen contacted with the stabilizing composition; staining the biological specimen contacted with the stabilizing composition; lysing red blood cells in the biological specimen contacted with the stabilizing composition; analyzing the biological specimen to determine the presence or absence of a condition of interest.

In another aspect of the invention, the method of paragraph [0026], wherein the stabilizing composition further comprises, an aliphatic aldehyde, an aqueous buffer selected from the group consisting of 4-(2-hydroxyethyl)-1-piperazineethanesulfonic acid, 3-morpholinopropane-1-sulfonic acid (MOPS), 2-(N-morpholino)ethanesulfonic acid (MES), and combinations thereof at a concentration in the composition providing the composition a pH from 5.9 to 8.0, and a preservative.

In another aspect of the invention, the method of paragraph [0027], wherein the heavy metal salt is chromium III chloride having a 0.03 Molar concentration in the composition and manganese II chloride having a 0.02 Molar concentration in the composition, the saccharide is fructose having a 2.6 Molar concentration in the sample, the aqueous buffer is 4-(2-hydroxyethyl)-1-piperazineethanesulfonic acid at a concentration in the composition providing the composition a pH from 7.0 to 7.4, the aliphatic aldehyde is formaldehyde having a concentration of 0.1 Molar in the composition, the preservative is sodium azide having a 0.01% (weight/volume) in the composition.

In another aspect of the invention, the method of claim paragraph [0026], wherein the storing is for at least 30 days.

In another aspect of the invention a stabilizing composition kit including a stabilizing composition tube having a stabilizing composition in a predetermined volume, the stabilizing composition comprising, a heavy metal salt, having an atomic number from 20 to 60; a saccharide; a pH from 5.9 to 8.0; and a solvent, an instruction set; a container; and a shipping container.

BRIEF DESCRIPTION OF THE DRAWINGS

FIG. 9 represents a prophetic example of stabilization of nucleic acids with a stabilization composition.

FIG. 10 represents a stabilizing composition kit.

DETAILED DESCRIPTION

Stabilizing compositions for stabilizing a post-draw, but pre-analysis sample include, a saccharide, at least one heavy metal salt, and a pH from 5.9 to 8.0. The stabilizing compositions may include an aliphatic aldehyde, a buffer, and a preservative. The stabilizing compositions stabilize a sample for analysis. The analysis preformed on the stabilized cell may determine the state of a condition of interest, quantification of absolute cell counts, cellular activity, and qualitative analysis of cell types. Stabilizing a sample means that cells of the sample retain their biophysical properties, including biophysical properties of cell surface markers, for analysis.

The stabilizing compositions may stabilize the sample from 1 hour to 30 hours. Preferably, the stabilizing compositions contain low concentrations of aliphatic aldehydes to reduce cross-linking of proteins. The stabilizing compositions stabilize cell surface markers on cells of a hematopoietic origin (leukocytes, hematopoietic stem cells), and other cell types not of a hematopoietic origin (circulating tumor cells, circulating endothelial cells and the like). The stabilizing composition stabilizes cell surface markers on leukocytes, including the following: CD3, CD4, CD8, CD14, CD16, CD19, CD34, CD45, CD45RA, CD45RO, CD56, CD62L, CD123, CD146, CD197, HLA-DR.

Preferably, the stabilizing compositions and methods may stabilize a sample for at least 16 days, and up to 30 days. The stabilizing compositions and methods may stabilize a sample for up to 180 days. The stabilizing compositions and methods do not utilize DMSO.

The sample may be any post-draw, but pre-analysis biological specimen of human or animal origin that contains cells, such as peripheral blood, synovial fluid, bone marrow aspirates, pleural fluid, spinal fluid, or a biopsy sample. Cells in the sample that are analyzed may be cells of hematopoietic origin and cells not of hematopoietic origin. Cells may further be grouped into different populations and further defined into many subpopulations. For example, leukocytes (a population of cells of hematopoietic origin) are categorized into three main subpopulations, namely, lymphocytes, monocytes, and granulocytes. Cells may be analyzed using cell surface markers, where the presence or absence of particular cell markers, or groups of particular cell surface markers, determines the cell type, cellular activation, and the presence or absence of a condition of interest.

Figure 1:
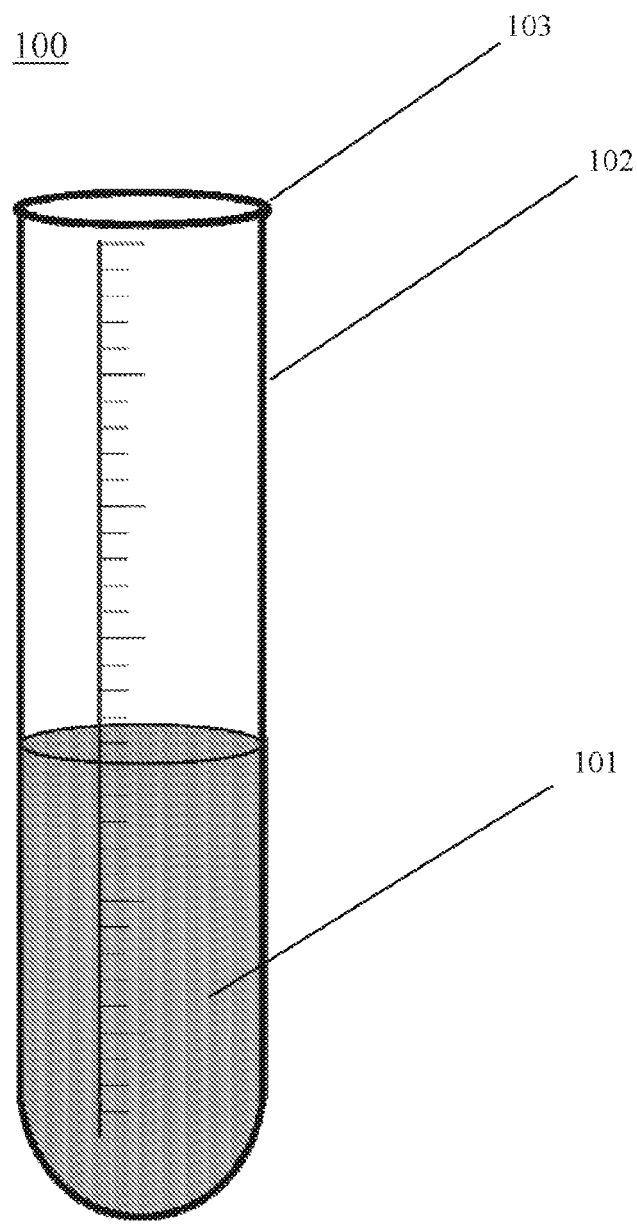
FIG. 1 represents a stabilizing composition tube 100.

FIG. 1 represents a stabilizing composition tube 100. The stabilizing composition tube includes a stabilizing composition 101 and a tube 102.

The stabilizing composition 101 includes at least one heavy metal salt, a saccharide, a pH from 5.9 to 8.0, and a solvent. The stabilizing composition 101 may further include an aliphatic aldehyde. The stabilizing composition 101 may further include a buffer. The stabilizing composition 101 stabilizes a sample from 1 hour to 30 hours. Preferably, the stabilizing composition 101 stabilizes a sample from 4 to 6 hours.

The at least one heavy metal salt of the stabilizing composition 101, wherein the heavy metal ion has an atomic number from 20 to 60, has complexing properties. Preferably, the heavy metal salts are chromium III chloride and manganese II chloride. The chromium III chloride concentration in the stabilizing composition 101 prior to contacting the sample is from 0.0002M to 0.1M. More preferably, the concentration in the stabilizing composition 101 of chromium III chloride prior to contacting the sample is 0.03M. The manganese II chloride concentration in the stabilizing composition 101 prior to contacting the sample is from 0.0001 to 0.1M. More preferably, the concentration in the stabilizing composition 101 of manganese II chloride prior to contacting the sample is 0.02M.

The saccharide of the stabilizing composition 101 may be a monosaccharide, such as dextrose or fructose. The saccharide may also be a disaccharide or polysaccharide. The preferred saccharide is fructose. The saccharide concentration in the stabilizing composition 101 prior to contacting the sample is from 1.5M to 3.0M. Preferably, the saccharide concentration in the stabilizing composition 101 prior to contacting the sample is 2.6M.

The stabilizing composition 101 has a pH of 5.9 to 8.0. Preferably, the pH in the stabilizing composition 101 is from 6.5 to 7.7. Most preferably the pH in the stabilizing composition 101 is from 7.0 to 7.4. To attain a pH from 5.9 to 8.0 for the stabilizing composition 101, sodium hydroxide may be added to the stabilizing composition to raise the pH from 5.9 to 8.0. The stabilizing composition 101 may include an aqueous buffer to maintain pH from 5.9 to 8.0, such as 4-(2-hydroxyethyl)-1-piperazineethanesulfonic acid (HEPES), 3-morpholinopropane-1-sulfonic acid (MOPS), and 2-(N-morpholino)ethanesulfonic acid (MES), and combinations thereof.

The stabilizing composition includes a solvent. The solvent carries the at least one heavy metal salt and a saccharide. The solvent may carry an aliphatic aldehyde, sodium hydroxide, an aqueous buffer, and a preservative. Preferably, the solvent is deionized or distilled water. More preferably, the solvent is distilled water.

The stabilizing composition 101 may include an aliphatic aldehyde at low concentrations to provide stability, while minimizing cross-linking of cell surface markers. Minimizing cross-linking of markers that are likely sensitive to fixation, such as CD45RA and CD45RO, and which commercial compositions do not purport to stabilize. The preferred aliphatic aldehyde is formaldehyde. The aliphatic aldehyde concentration in the stabilizing composition 101 prior to contacting the sample is from 0.0 to 0.3M. Preferably the aliphatic aldehyde concentration in the stabilizing composition 101 prior to contacting the sample is from 0.1 to 0.15M. Most preferably the aliphatic aldehyde concentration in the stabilizing composition 101 prior to contacting the sample is 0.1M.

The stabilizing composition 101 may include a preservative configured to inhibit bacterial growth in the stabilizing composition. The preservative may be sodium azide from 0.005% (weight/volume) to 0.02%, chloramphenicol from 0.005% (weight/volume) to 0.02%, neomycin from 0.005% (weight/volume) to 0.02%, or sterile filtration. Preferably, the preservative is 0.01% sodium azide.

The tube 102 of the stabilizing composition tube 100 may be a tube of any size configured for holding liquids that is compatible with the stabilizing composition 101. The stabilizing composition tube 100 may include an anticoagulant spray coated on the interior of the tube 102. A stabilizing composition tube 102 having the anticoagulant is configured for receiving and holding a sample, when the sample is whole blood. The anticoagulant may be ethylenediaminetetraacetic acid di-potassium (K2EDTA), ethylenediaminetetraacetic acid tri-potassium (K3EDTA), Heparin, or Sodium Citrate. The preferred anticoagulant is K2EDTA. When the tube 102 contains the anticoagulant, it is configured for being subjected to ultra-low temperature (minus 20 degrees Celsius to minus 200 degrees Celsius) use. The tube 102 may be made of a non-reactive material, such as polypropylene or glass.

The lid 103 of the stabilizing composition tube 100 is configured for placement on the tube 102 to seal the tube 102 to keep liquid in the tube 102 when inverted. The lid 103 is also configured to keep contaminants that are airborne or the like out of the tube 102. The lid 103 may be configured for being subjected to ultra-low temperatures and maintaining the seal with the tube 102. The lid 103 may be of a non-reactive material including either plastic, rubber, Teflon, metal, and combinations thereof. The lid 103 may be a screw tap to store the stabilizing composition prior to contacting a sample. The lid 103 may be configured to form a vacuum inside the tube 102 maintaining a sterile environment inside the tube 102.

Figure 2:
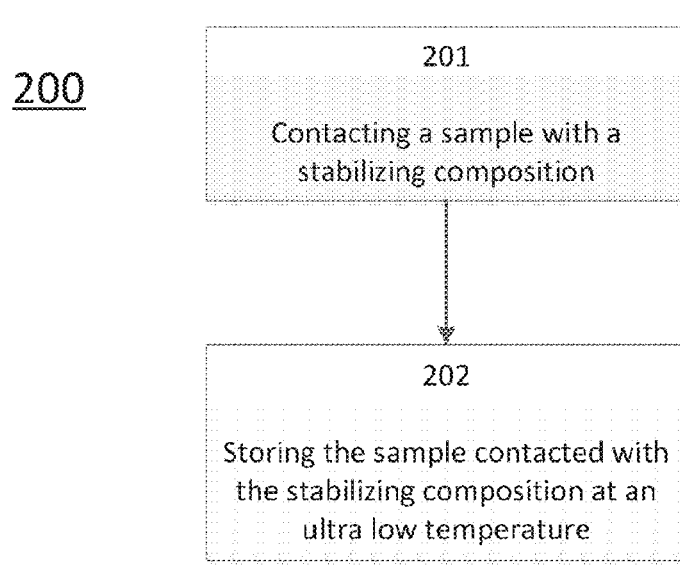
FIG. 2 illustrates a method for stabilization of a sample using a stabilization composition.

FIG. 2 illustrates a method 200 of stabilizing a sample with a stabilizing composition tube. In 201, the sample is contacted with the stabilizing composition. The contacting is within 4 hours of drawing the sample. The contacting may include drawing the sample into a blood collection tube. The contacting may further include pipetting the stabilizing composition from a stabilizing composition tube into a blood collection tube, where volume ratio of the stabilizing composition to the sample is from 1 to 1, to 1 to 9. The preferred volume ratio of the stabilizing composition to the sample is approximately 1 to 4. The contacting may further include inverting the blood collection tube one or more times. The contacting may include drawing the sample into a stabilizing composition tube having an anticoagulant. The contacting may further include inverting the stabilizing composition tube having the anticoagulant one or more times. The contacting may further include dividing the sample contacted with the stabilizing composition into one or more aliquots.

In 202, the sample contacted with the stabilizing composition is stored at an ultra-low temperature (minus 20 degrees Celsius to minus 200 degrees Celsius) for at least 1 day. The sample may be stored up to 180 days. Preferably the sample is stored for at least 30 days. The storage may further include transporting the sample to a location for analysis. The preferred ultra-low temperature is minus 70 degrees Celsius. The storage may include dry ice for transportation.

Figure 3:
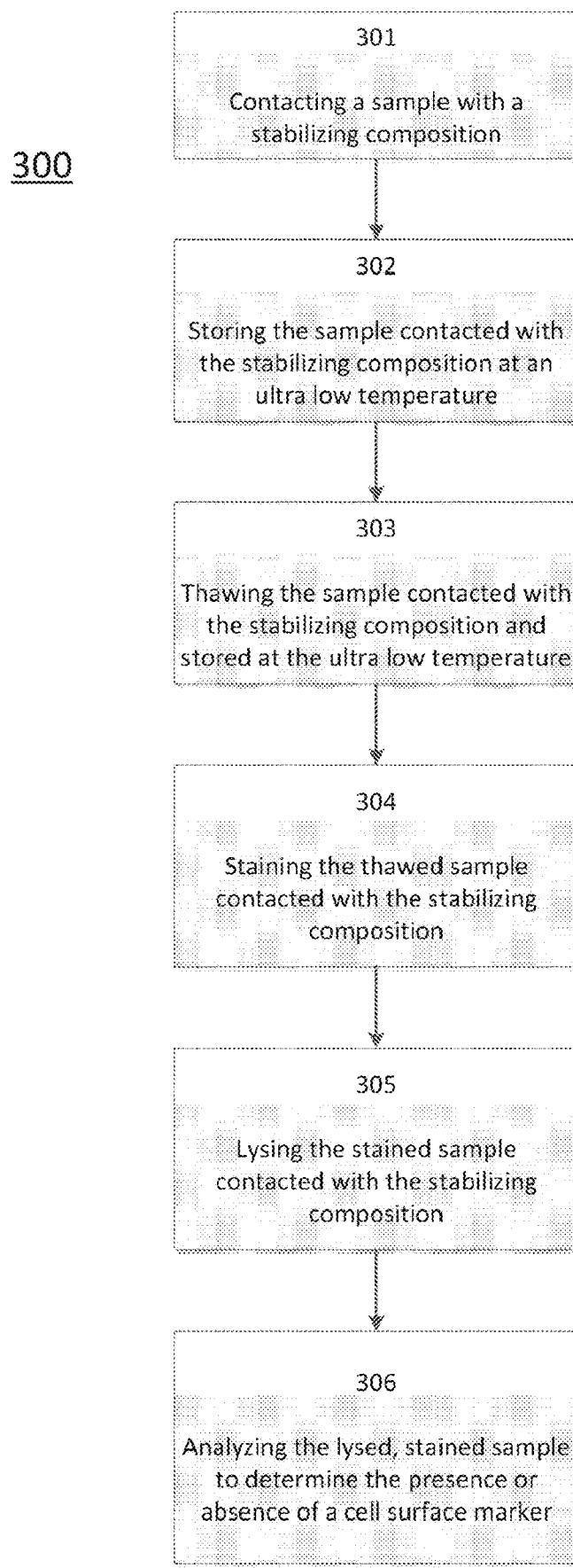
FIG. 3 illustrates a method for analyzing a sample stabilized with a stabilization composition.

FIG. 3 illustrates a method 300 of analyzing a sample to determine the presence or absence of cell surface markers. In 301, the sample is contacted with the stabilizing composition. The contacting is within 4 hours post-draw of the sample. The contacting may include drawing the sample into a blood collection tube. The contacting may further include pipetting the stabilizing composition from a stabilizing composition tube into a blood collection tube, where volume ratio of the stabilizing composition to the sample is from 1 to 2, to 1 to 5. The preferred volume ratio of the stabilizing composition to the sample is approximately 1 to 4. The contacting may further include inverting the blood collection tube one or more times. The contacting may include drawing the sample into a stabilizing composition tube having an anticoagulant. The contacting may further include inverting the stabilizing composition tube having the anticoagulant one or more times.

In 302, the sample contacted with the stabilizing composition is stored at an ultra-low temperature (minus 20 degrees Celsius to minus 200 degrees Celsius) for at least 1 day. The sample may be stored up to 180 days. Preferably the sample is stored for at least 30 days. The storage may further include transporting the sample to a location for analysis. The preferred ultra-low temperature is minus 70 degrees Celsius. The storage may include dry ice for transportation.

In 303, the sample stored at an ultra-low temperature is thawed. Thawing may include removing the sample from the storage container where thawing happens in open air at ambient temperature (from 18 to 24 degrees Celsius). Thawing may include contacting the sample with a water bath at ambient temperature. Preferably, the thawing is in open air at ambient temperature.

In 304, the thawed sample is stained immediately (within 1 hour). Cell surface markers are stained with one or more antibody-fluorochrome conjugate(s) and incubated at temperatures and for length determined by the antibody fluorochrome conjugate used for staining. When the sample is rare cells (e.g. hematopoietic stem cells, circulating tumor cells, circulating endothelial cells) the staining may further include concentrating cells having the surface markers of interest, in the sample via magnetic bead separation or the like. Staining may include apportioning volumes (e.g. 50-100 µL) to a conventional flow cytometry sample processing tube (e.g. 5 mL round-bottom polystyrene tube). The staining may further include incorporation of fluorescent polystyrene beads for determination of absolute cell counts via flow cytometry.

In 305, the red blood cells (RBC) in the stained sample are lysed with a lysis buffer. The lysis buffer may include ammonium chloride. This staining and lysing protocol of 304 and 305 is referred to as lyse-no-wash (LNW). The lysing may include preparing the sample for histological analysis, such as preparation of a slide mount for microscopy.

In 306, the lysed, stained sample contacted with the stabilizing composition is analyzed. The analysis may be through flow cytometry. Flow cytometry may determine cell types and cell count, by cell surface marker analysis. Cell types and cell count may be used to determine the presence or absence of a condition of interest. The analysis may be histological, such as using microscopy.

Figure 4:
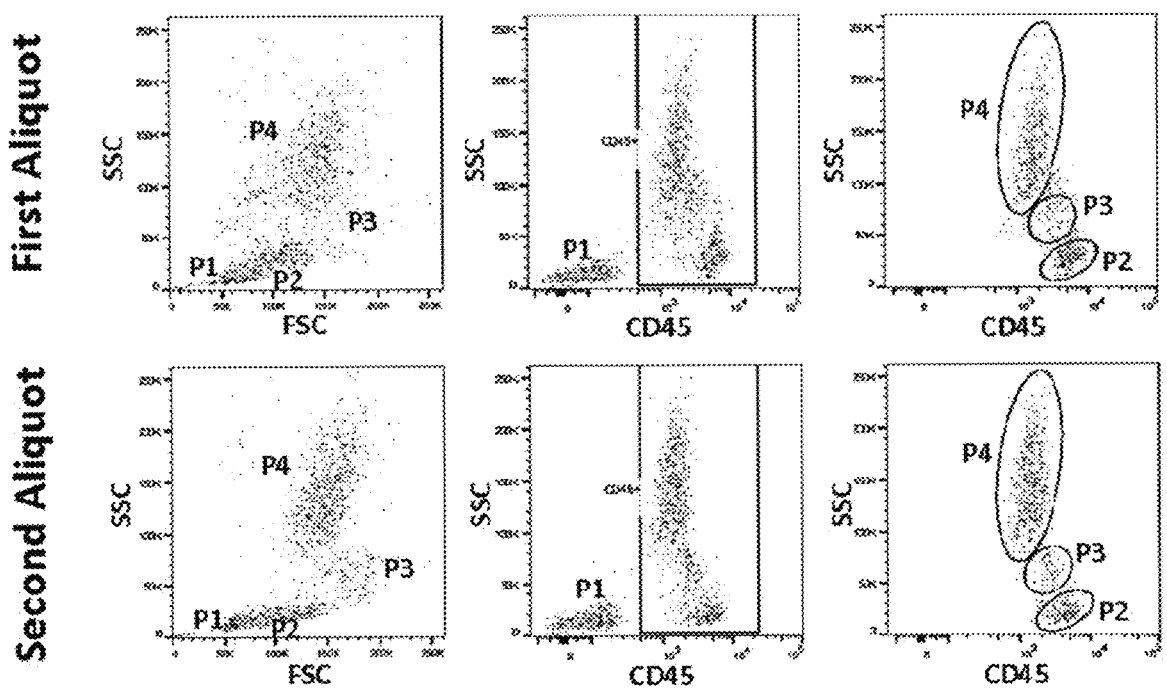
FIG. 4 illustrates analysis of a sample stabilized with stabilizing compositions having different concentrations of aliphatic aldehyde.

FIG. 4 illustrates analysis results of a sample stabilized with stabilizing compositions having different concentrations of aliphatic aldehyde. The stabilizing composition contacted with the first aliquot corresponding to FIG. 4 included prior to contacting the sample, 2.6 M fructose, 0.02 M Manganese Chloride, 0.03 M Chromium III Chloride, 0.001 M HEPES Buffer, 0.01% (weight/volume) sodium azide, and a pH of 7. The stabilizing composition contacted with the second aliquot corresponding to FIG. 4 included prior to contacting the sample, 0.10 M formaldehyde, 2.6 M fructose, 0.02 M Manganese Chloride, 0.03 M Chromium III Chloride, 0.001 M HEPES Buffer, 0.01% (weight/volume) sodium azide, and a pH of 7. While the foregoing stabilizing compositions were used in this instance, other stabilizing compositions may be used.

A post-draw sample of human whole blood was drawn into a blood collection tube having an anticoagulant of spray-dried $K_2$EDTA (7.2 mg/4 mL tube). The sample was then portioned into a first aliquot in a first tube and a second aliquot in a second tube. The first aliquot was contacted with the stabilizing composition of the first aliquot in the tube in a volume ratio of approximately 1 part of the stabilizing composition to 4 parts of the first aliquot. The contacting further included inverting the first tube one or more times.

The second aliquot was contacted with the stabilizing composition of the second aliquot in a tube having in a volume ratio of approximately 1 part of the stabilizing composition to 4 parts of the second aliquot. The contacting further included inverting the second tube one or more times. The first aliquot and the second aliquot were stored at an ultra-low temperature of minus 70 degrees Celsius for a period of 30 days.

After storage, the first aliquot and the second aliquot were thawed at ambient room temperature. The thawed first and second aliquots were stained for leukocyte cell surface marker CD45. The stained first and second aliquots were then lysed according to a LNW method and analyzed via flow cytometer.

The results of the flow cytometry analysis are displayed as density dot plots, forward scatter (FSC) versus side scatter (SSC) and SSC vs CD45 for both the first aliquot and the second aliquot, as depicted in FIG. 4. Distinct cell populations are visible for both the first and the second aliquot: RBC debris (P1), lymphocytes (P2), monocytes (P3) granulocytes (P4). The stabilizing composition of the second aliquot, containing a low concentration of an aliphatic aldehyde yields better resolution of these populations by light scatter parameters than the stabilizing composition of the first aliquot, having no aliphatic aldehyde. The better resolution in density dot plots of the second aliquot is demonstrated by more condensed and defined clusters, especially for monocytes (P2).

This indicates that both stabilizing compositions, one containing a low concentration of aliphatic aldehyde and the other containing no aliphatic aldehyde both produce density dot plots with distinct cell populations visible for analysis. Further, this indicates that if desired analysis includes high resolution scatter patterns, a stabilizing composition with a low concentration of aliphatic aldehyde may be desired.

Figure 5:
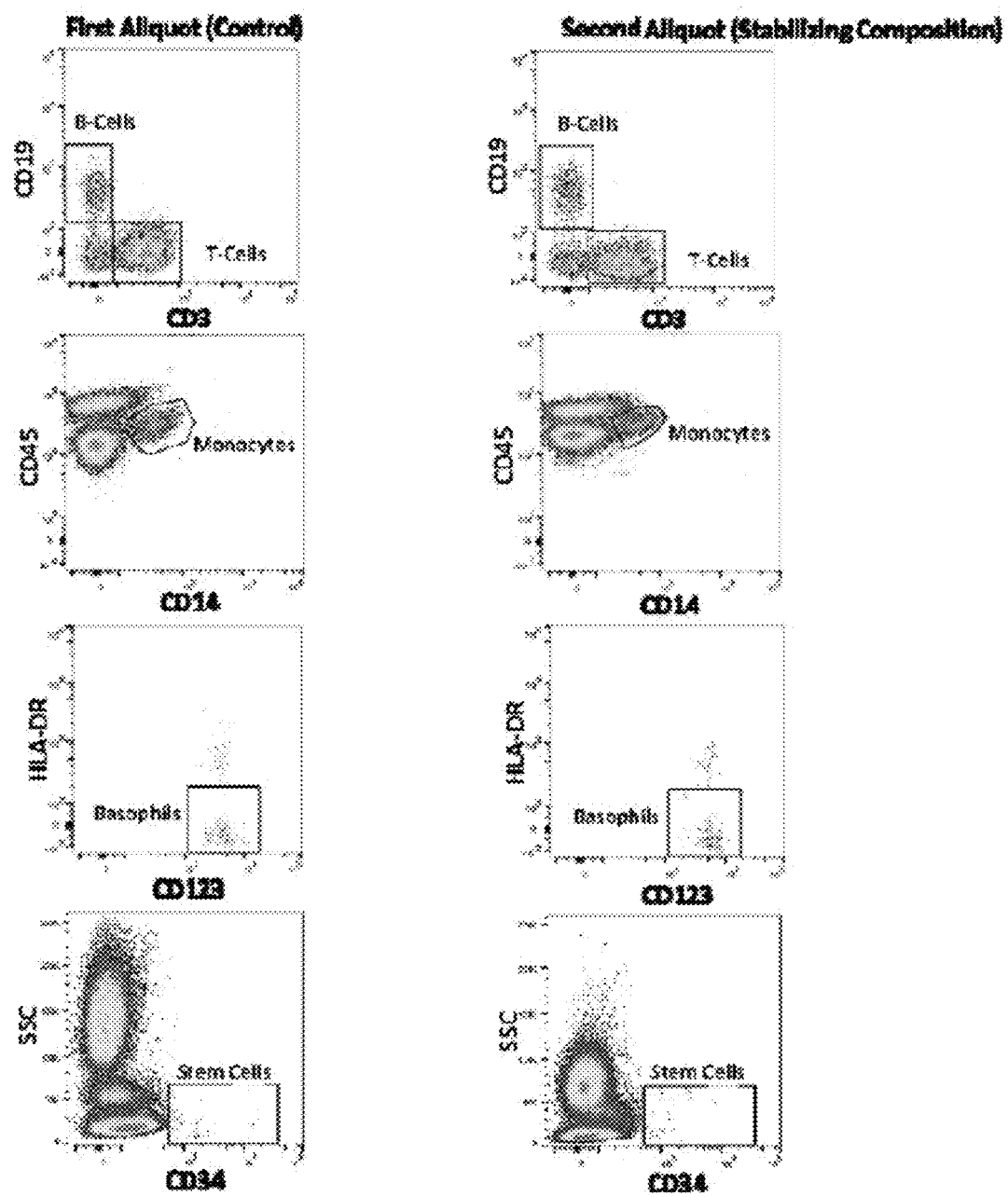
FIG. 5 illustrates analysis of lymphocytes, monocytes, granulocytes, and hematopoietic stem cells stabilized by a stabilizing composition.

FIG. 5 illustrates analysis of stabilization of cell populations of hematopoietic origin, namely, lymphocytes, monocytes, granulocytes and hematopoietic stem cells in a post-draw sample contacted with 1) an anticoagulant only, and 2) a stabilizing composition including prior to contacting the sample 0.10 M formaldehyde, 2.6 M fructose, 0.02 M Manganese Chloride, 0.03 M Chromium III Chloride, 0.001 M HEPES, 0.01% (weight/volume) sodium azide. While the stabilizing composition of the immediately preceding sentence was used in this instance, other stabilizing compositions may be used. The sample of human whole blood was drawn into a blood collection tube having an anticoagulant of spray-dried K2EDTA (7.2 mg/4 mL tube) and portioned into a first aliquot in a first tube and a second aliquot in a second tube. The contacting further included inverting the first tube one or more times.

The second aliquot was further contacted with the stabilizing composition in a volume ratio of 1 part of the stabilizing composition to 4 parts of the second aliquot in the second tube. The contacting further included inverting the second tube one or more times. The first aliquot was stored at room temperature for 4 hours. The second aliquot was stored, and thawed in accord with the protocol of FIG. 4. Both the first aliquot and the second aliquot were stained, lysed, and analyzed according to the protocol of FIG. 4.

The first and second aliquot were analyzed via flow cytometry for cell surface markers (as provided in the table below) that define parameters for analysis of lymphocytes, monocytes, granulocytes, and hematopoietic stem cells. The analysis of gated CD45+ cells was plotted with density dot plots using the cell surface marker parameters as shown in FIG. 5. The plots of FIG. 5 correspond to the following percentages for the analysis of cells of a hematopoietic origin:

| Cell Type | Defining Parameters | First Aliquot (Control) | Second Aliquot (Day 30) | Percent of Control |
|---|---|---|---|---|
| T-cells (% of lymphocytes) | CD45$^+$CD3$^+$CD19$^-$ | 71.6 | 74.9 | 105 |
| B-cells (% of lymphocytes) | CD45$^+$CD3$^-$CD19$^+$ | 10.6 | 10.4 | 98 |
| Monocytes (% of CD45$^+$) | CD45$^+$CD14$^+$ | 8.2 | 7.7 | 94 |
| Basophils (% of CD45$^+$) | Low SSC CD45$^+$CD123$^+$HLADR$^-$ | 0.6 | 0.6 | 100 |
| Stem Cells (% of CD45$^+$) | Low SSC CD45$^+$CD34$^+$ | 0.063 | 0.061 | 97 |

Comparing the first aliquot and the second aliquot, the stabilizing composition of the second aliquot shows no significant quantitative variation (e.g. within 10%) in populations of cell types for lymphocytes (T-Cells and B-Cells), monocytes, granulocytes (basophils), or hematopoietic stem cells as compared to the first aliquot. This indicates that the stabilization compositions may stabilize cells of hematopoietic origin in samples to yield analysis results that are accurate as compared to immediate analysis of a fresh whole blood sample.

Figure 6:
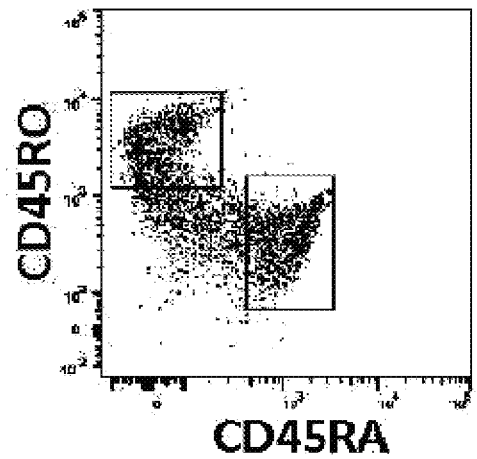
FIG. 6 illustrates a comparative analysis of a sample for lymphocytes markers CD45RA and CD45RO stabilized by a stabilizing composition and a commercially available composition.
Figure 6:
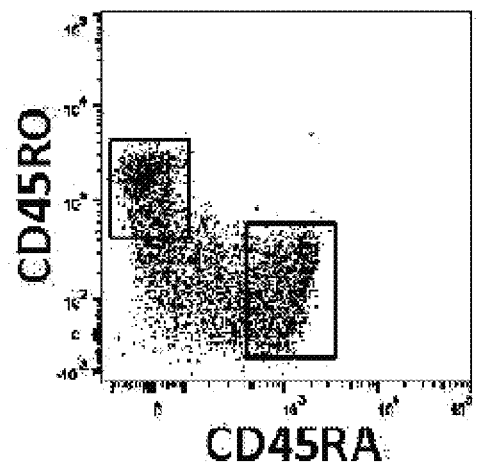
Figure 6:
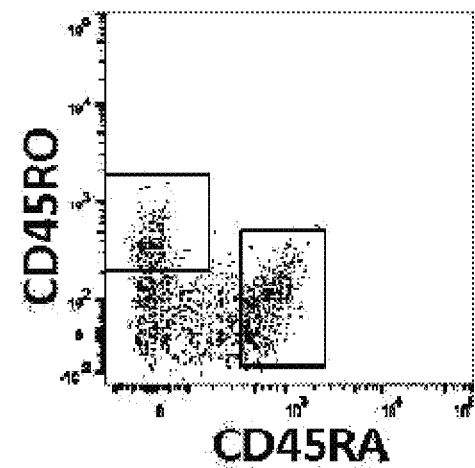

FIG. 6 compares stability of cell surface markers CD45RA and CD45RO for lymphocytes in a post-draw sample contacted with 1) an anticoagulant, 2) a stabilizing composition, and 3) a commercially available composition that stabilizes a limited number of lymphocyte cell surface markers, that contains at least approximately 1% (weight/volume) of paraformaldehyde. The sample was human whole blood. The stabilizing composition contacted with the second aliquot included prior to contacting the sample, 0.10 M formaldehyde, 2.6 M fructose, 0.02 M Manganese Chloride, 0.03 M Chromium III Chloride, 0.001 M HEPES, 0.01% (weight/volume) sodium azide. In this instance the stabilizing composition of the preceding sentence was used, but other stabilizing compositions may be used.

The sample was contacted with a blood collection tube having a spray-dried anticoagulant of K$_2$EDTA (7.2 mg/4 mL tube). The collecting further included inverting the blood collection tube one or more times. The sample was then portioned into a first aliquot in a first tube, a second aliquot in a second tube, and a third aliquot in a third tube. The first aliquot was stored at room temperature for 4 hours and was stained and lysed in accord with the protocol of FIG. 4.

The second aliquot was further contacted with the stabilizing composition in a volume ratio of approximately 1 part of the stabilizing composition to 4 parts of the second aliquot in the second tube. The contacting further included inverting the second tube one or more times. The second aliquot contacted with the stabilizing composition was divided further into a first sub-aliquot and a second sub-aliquot. The first sub-aliquot of the second aliquot was stored for 5 days at minus 70 degrees Celsius, and was thawed, lysed and washed according to the protocol of FIG. 4. The second sub-aliquot of the second aliquot was stored for 50 days at minus 70 degrees Celsius, and was further thawed, lysed and washed according to the protocol of FIG. 4.

The third aliquot was further contacted with the commercial composition by adding the commercial composition to the third aliquot at a volume ratio of approximately 1 part of the commercial composition to 4 parts of the third aliquot in the third tube. The contacting further included inverting the third tube one or more times. The third aliquot was stored at 2-8 degrees Celsius for 5 days. The third aliquot was equilibrated to ambient room temperature, stained, and lysed in accord with the protocol of FIG. 4. The first aliquot was analyzed via flow cytometry. The second aliquot was analyzed via flow cytometry for both the first and second sub-aliquots, and third aliquot was analyzed via flow cytometry.

FIG. 6. displays dot plots of CD45RA and CD45RO positive regions of gated lymphocytes of all three treatments. The plots of FIG. 6 correspond to the following percentages of CD45RA and CD45RO positive lymphocytes.

|  | Second Aliquot | | Third Aliquot | |
| --- | --- | --- | --- | --- |
|  | % Lymphocytes | % of Control | % Lymphocytes | % of Control |
| CD45RO$^+$ | | | | |
| 5 Day | 33.8 | 102 | 13.5 | 41 |
| 50 Day | 35.6 | 108 | * | * |
| First Aliquot (Control) | 33.0 | 100 | | |
| CD45RA$^+$ | | | | |
| 5 Day | 39.6 | 91 | 19.4 | 44 |
| 50 Day | 39.4 | 90 | * | * |
| First Aliquot (Control) | 43.7 | 100 | | |

*not tested

The density dot plot displaying stabilization by the stabilizing composition is the second sub-aliquot of the second aliquot. Analysis of the first aliquot yielded a value of 33.0% CD45RO positive staining lymphocytes. Comparing the second aliquot and the third aliquot to the first aliquot, the second aliquot contacted with the stabilizing composition and stored according to the stabilization method provides a 10% or less deviation from the first aliquot up to 50 days, for CD45RA and CD45RO markers. Whereas the third aliquot contacted with the commercial composition demonstrates a 59% deviation from the first aliquot, for the CD45RO positive cell surface marker, and a 56% deviation from the first aliquot for the CD45RA positive cell surface marker. This indicates that the stabilizing composition using the stabilizing method provides 57% and 47% more stability than the commercial composition after 5 days of storage for CD45RO and CD45RA cell surface markers, respectively. This further indicates that the stabilizing composition using the stabilization method allows for analysis of cell surface markers for at least 45 days longer than the commercial composition.

Figure 7:
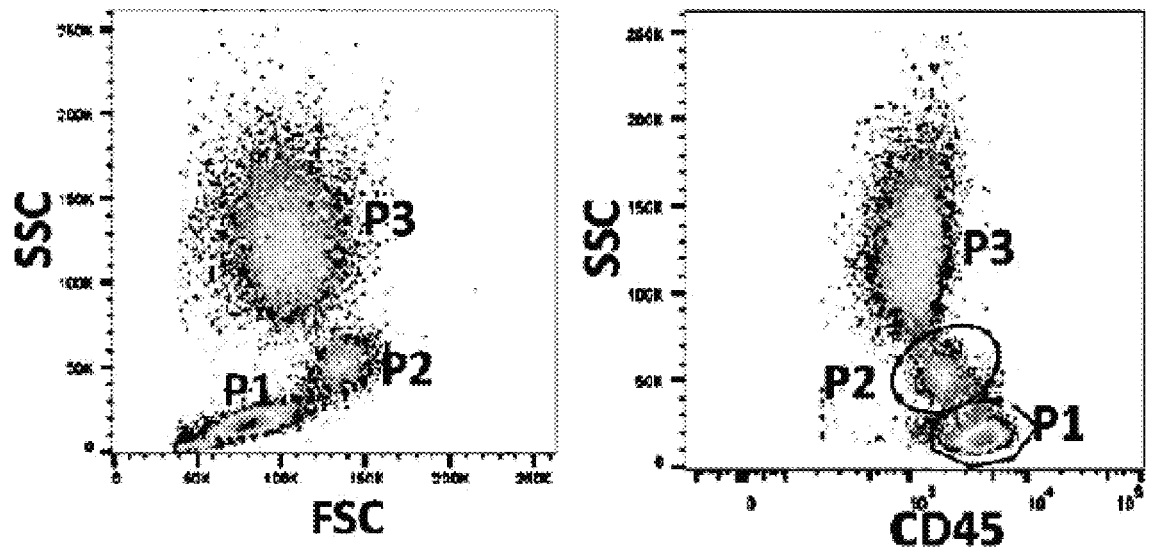
FIG. 7 illustrates a comparative analysis of light scatter properties of a sample stabilized with a stabilizing composition as compared to analysis of a fresh sample.
Figure 7:
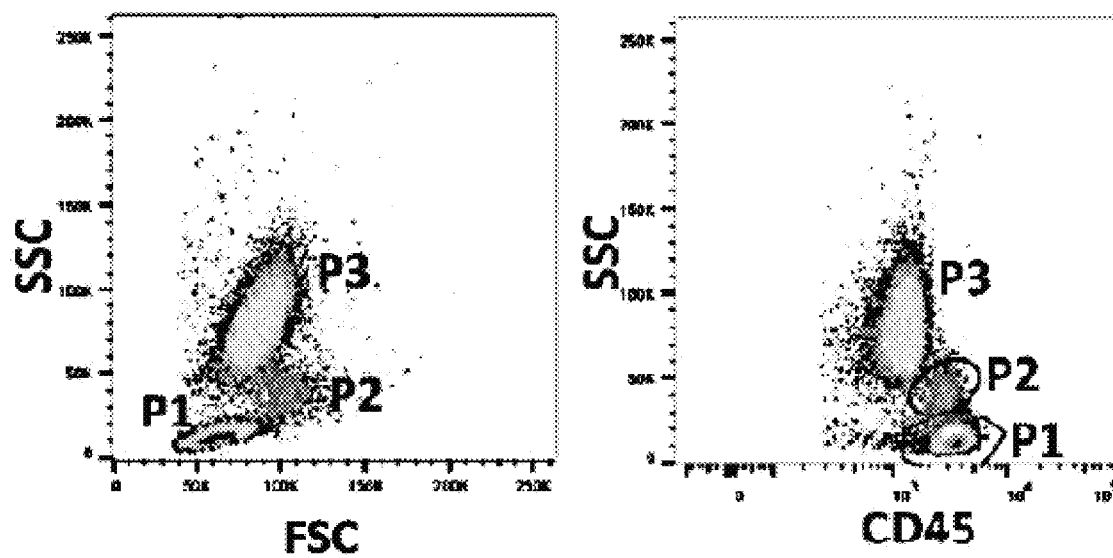

FIG. 7 illustrates comparative analysis of a sample stabilized with a stabilizing composition and method as compared to immediate analysis of the sample. The sample is human whole blood. The sample was contacted with a blood collection tube having an anticoagulant of spray-dried K$_2$EDTA (7.2 mg/4 mL tube). The contacting further included inverting the blood collection tube one or more times. The sample was then portioned into a first aliquot in a first tube, and a second aliquot in a second tube. The first aliquot was stored at ambient room temperature for 4 hours and was stained and lysed in accord with the protocol of FIG. 4.

The second aliquot was contacted with a stabilizing composition that included prior to contacting the sample, 0.10 M formaldehyde, 2.6 M fructose, 0.02 M Manganese Chloride, 0.03 M Chromium III Chloride, 0.001 M HEPES Buffer, 0.01% (weight/volume) sodium azide, and a pH of 7. The sample was contacted with the stabilizing composition in the second tube having an anticoagulant of spray-dried K2EDTA (7.2 mg/4 mL tube) in a volume ratio of approximately 1 part of the stabilizing composition to 4 parts of the second aliquot. The contacting further included inverting the second tube one or more times. The second aliquot was stored at an ultra-low temperature of minus 70 degrees Celsius for a period of 50 days. While the stabilizing composition of this paragraph was used in this instance, other stabilizing compositions may be used.

The first aliquot was stained for leukocyte cell surface marker CD45 within 4 hours of draw. The stained first aliquot was lysed according to the protocol of FIG. 4 and analyzed via flow cytometer. This immediate analysis of the sample provides a control of an accurate analysis. The second aliquot was thawed, stained for cell surface marker CD45, and lysed in accord with the protocol of FIG. 4. The second aliquot was analyzed via flow cytometer.

The results of the flow cytometry analysis are displayed in density dot plots as FSC versus SSC and SSC versus CD45 for both the first aliquot and the second aliquot. Numerical values corresponding to the density dot plots and baseline are as follow:

| Cell Type | First Aliquot | Second Aliquot | Percent of First Aliquot (control) |
|---|---|---|---|
| % Lymphocytes | 29.7 | 30.3 | 102 |
| % Monocytes | 8.36 | 8.17 | 97 |
| % Granulocytes | 60.2 | 57.1 | 95 |

As is seen in the density dot plots, the second aliquot shows light scatter characteristics for determination of population clusters comparable to the first aliquot. Three cell populations, namely lymphocytes (P1) monocytes (P2) and granulocytes (P3) are visible and clear for both the first and second aliquots. This demonstrates that the stabilizing composition and method preserve light scatter properties to yield density dot plot analysis results that are accurate as compared to immediate analysis of a sample that is fresh whole blood.

Further, the percentages of the populations can be quantified as a percent of total leukocytes staining positive for cell surface marker CD45 (CD45 percentage). For the lymphocyte population, the CD45 percentage of the first aliquot is 29.7%, and the CD45 percentage of the second aliquot is 30.3%. This demonstrates that the stabilizing composition and method preserve light scatter properties and the CD45 marker on lymphocytes with a 2.0% deviation from the sample as immediately drawn.

Further, with respect to the monocyte population, the first aliquot has a CD45 percentage of 8.36%, and the second aliquot had a CD45 percentage of 8.17%. This demonstrates that the stabilizing composition and method stabilized CD45 on monocytes with a deviation of 2.3% from the sample as immediately drawn. Further, with respect to the granulocyte population, the first aliquot had a CD45 percentage of 60.2%, and the second aliquot had a CD45 percentage of 57.1%. This demonstrates that the stabilizing composition and method stabilize CD45 on granulocytes with a 5.4% deviation from the sample as immediately drawn. This indicates that the stabilization compositions may stabilize light scatter properties and the CD45 marker in samples to yield analysis results that are accurate as compared to immediate analysis of a fresh whole blood sample.

Figure 8:
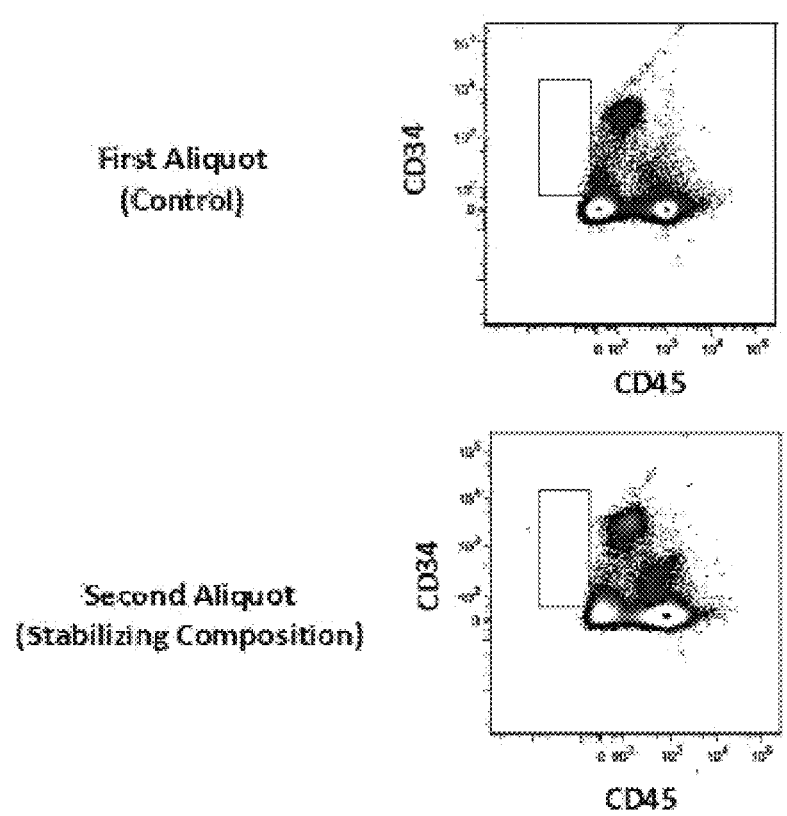
FIG. 8 illustrates analysis of endothelial colony forming cell markers CD34+ and CE45-stabilized by a stabilizing composition.

FIG. 8 illustrates analysis of endothelial colony forming cell markers $CD34^+$ and $CD45^-$ stabilized by a stabilizing composition in a post-draw sample contacted with 1) an anticoagulant only, and 2) a stabilizing composition including prior to contacting the sample, 2.6 M fructose, 0.02 M Manganese Chloride, 0.03 M Chromium III Chloride, 0.001 M HEPES. While the stabilizing composition of the immediately preceding sentence was used in this instance, other stabilizing compositions may be used. The sample of human umbilical cord blood was drawn into a blood collection tube having an anticoagulant of spray-dried K2EDTA (7.2 mg/4 mL tube). Mononuclear cells were fractionated by ficoll gradient centrifugation and washed in PBS. The mononuclear cells were portioned into a first aliquot in a first tube, and a second aliquot in a second tube. The first aliquot was stained for cell surface markers CD45 and CD34.

The second aliquot was contacted with the stabilizing composition in a volume ratio of 1 part of the stabilizing composition to 4 parts of the second aliquot in the second tube. The contacting further included inverting the second tube one or more times. The first aliquot was stored at room temperature for 4 hours. The second aliquot was stored, and thawed in accord with the protocol of FIG. 4. The second aliquot was stained and lysed according to the protocol of FIG. 4.

The first and second aliquot were analyzed via flow cytometry for cell surface markers (as provided in the table below) that define parameters for analysis of endothelial colony forming cells, which are cells of a non-hematopoietic origin. The analysis of the endothelial colony forming cells was plotted with density dot plots using the cell surface marker parameters as shown in FIG. 8. The plots of FIG. 8 correspond to the following percentages for the analysis of cells of a non-hematopoietic origin:

| Cell Type | Defining Parameters | Aliquot 1 (Control) | Aliquot 2 (Day 30) | Percent of Control |
|---|---|---|---|---|
| Endothelial Colony Forming Cell (% of Mononuclear Cells) | $CD34^+$ $CD45^-$ | 0.0503 | 0.0461 | 92 |

Comparing the first aliquot and the second aliquot, the stabilizing composition shows no significant quantitative variation (e.g. within 10%) for endothelial colony forming cells. This indicates that the stabilization compositions may stabilize cells of non-hematopoietic origin in samples to yield analysis results that are accurate as compared to immediate analysis of a fresh whole blood sample.

FIG. 9 illustrates a prophetic example for stabilizing nucleic acids (DNA, RNA, mRNA, miRNA) with the stabilizing composition. Preferably the stabilizing composition is, 2.6 M fructose, 0.02 M Manganese Chloride, 0.03 M Chromium III Chloride, 0.001 M HEPES, 0.01% (weight/volume) sodium azide. The stabilizing composition may not contain an aliphatic aldehyde, which may interfere with downstream analysis. While the stabilizing composition of the immediately preceding sentence will be used in this instance, other stabilizing compositions may be used.

A post draw sample, such as human whole blood is drawn into a blood collection tube having an anticoagulant of spray-dried K2EDTA (7.2 mg/4 mL tube) and portioned into a first aliquot in a first tube. The contacting may further include inverting the first tube one or more times. The first aliquot is stored and thawed in accord with the protocol of FIG. 4. As represented by step A, the first aliquot is then stained for desired markers, such as staining with fluorescent antibody fluorochrome conjugates specific to a marker (antigen) of interest on a cell for analysis. Step A may include licensing the red blood cells of the stained sample.

As represented by step B the stained cells of the first aliquot will be sorted for analysis, such as through fluorescence activated cell sorting (FACS), to separate stained cells of the first aliquot. As represented in step C, nucleic acid from the stained and sorted cells is extracted. As represented in step D, the extracted nucleic acid from the stained and separated cells will be analyzed, such as through amplification via polymerase chain reaction and next generation sequencing (high-throughput sequencing). As represented in step E, the analyzing may further include quantitation of the nucleic acid, such as through spectrophotometric analysis, to determine gene expression.

FIG. 10 represents a stabilizing composition kit 1000. The stabilizing composition may be part of a stabilizing composition kit 1000, which may be used in the field close to the biological source or in a laboratory. The stabilizing composition kit 1000 includes, at least one stabilizing composition tube 1004 and instructions 1008. The stabilizing composition kit 1000 may include a container 1002 and a shipping container 1006.

The stabilizing composition tube 1004 contains the stabilizing composition in a predetermined liquid volume configured for addition of a sample to the stabilizing composition tube 1004. Preferably, the predetermined liquid volume is configured for receiving a sample in a ratio of 1 part stabilizing composition to 4 parts sample. The stabilizing composition tube 1004 may include a lid (not pictured).

The stabilizing composition tube 1004 may be a tube of any size configured for holding liquids that is compatible with the stabilizing composition. The stabilizing composition tube 1004 may include an anticoagulant spray coated on the interior of the stabilizing composition tube 1004. A stabilizing composition tube 1004 having the anticoagulant is configured for receiving and holding a sample, when the sample is whole blood. The anticoagulant may be ethylenediamine-tetraacetic acid di-potassium (K2EDTA), ethylenediamine-tetraacetic acid tri-potassium (K3EDTA), Heparin, or Sodium Citrate. The preferred anticoagulant is K2EDTA. When the stabilizing composition tube 1004 contains the anticoagulant, it is configured for being subjected to ultra-low temperature (minus 20 degrees Celsius to minus 200 degrees Celsius) use. The tube 102 may be made of a non-reactive material, such as polypropylene or glass.

The lid of the stabilizing composition tube 1004 is configured for placement on the stabilizing composition tube 1004 to seal the stabilizing composition tube 1004 to keep liquid in the stabilizing composition tube 1004 when inverted. The lid is also configured to keep contaminants that are airborne or the like out of the stabilizing composition tube 1004. The lid may be configured for being subjected to ultra-low temperatures and maintaining the seal with the stabilizing composition tube 1004. The lid may be of a non-reactive material including either plastic, rubber, Teflon, metal, and combinations thereof. The lid may be a screw tap to store the stabilizing composition prior to contacting a sample. The lid may be configured to form a vacuum inside the stabilizing composition tube 1004 maintaining a sterile environment inside the stabilizing composition tube 1004.

The instructions 1008 of the stabilizing composition kit 1000 are configured to instruct stabilizing the sample using the stabilization composition kit 1000. The instructions may include detail on performing the steps in FIG. 2.

The container 1002 is configured to contain at least one stabilizing composition tube 1004 and the instructions 1008. The container 1002 may be configured to contain the shipping container 1006, where collectively the stabilizing composition tube 1004, instruction 1008, and the shipping container 1006 are referred to as the contents of the kit. The container may be of any non-reactive material, such as cardboard, plastic, or polystyrene. The container may be of any geometric shape configured for the holding the contents of the kit, such as a cuboid, cylinder, or triangular prism. The container may further include a closure to keep the contents of the kit in the container when inverted. The closure may be of any non-reactive material, such as cardboard, plastic, or polystyrene.

The shipping container 1006 is configured to contain a stabilizing composition tube 1004 containing the sample and is configured to substantially maintain the temperature of the stabilizing composition tube 1004 when shipped for analysis. The shipping container is made from insulative material configured for substantially maintaining the temperature of the stabilizing composition tube having sample, such as foam, thermal bubble wrap, or Styrofoam. The shipping container may be of any geometric shape configured for the holding the stabilizing composition tube having sample, such as a cuboid, cylinder, or triangular prism. The shipping container may further include a closure to keep the stabilizing composition tube having sample in the container when inverted. The closure may be of any insulative material, such as foam, thermal bubble wrap, or Styrofoam.

The invention claimed is:

1. A method for stabilizing a biological specimen post-draw and prior to analysis, the method comprising:
contacting a biological specimen having cells of hematopoietic or non-hematopoietic origin and of a volume sufficient to conduct flow cytometry with a stabilizing composition, the stabilizing composition comprising:
a heavy metal salt,
saccharide having a concentration in the stabilizing composition from 1.5 to 3.0 Molar,
an aliphatic aldehyde having a concentration in the stabilizing composition from 0.001 to 0.15 Molar,
a pH from 5.9 to 8.0, and
a solvent;
storing the biological specimen contacted with the stabilizing composition at a temperature from minus 20 degrees Celsius to minus 200 degrees Celsius for at least 1 day to stabilize the biological specimen.

2. The method of claim 1, wherein
the aliphatic aldehyde has a concentration in the stabilizing composition from 0.001 to 0.1 Molar; and
wherein the stabilizing composition further comprises
an aqueous buffer selected from the group consisting of 4-(2-hydroxyethyl)-1-piperazineethanesulfonic acid, 3-morpholinopropane-1-sulfonic acid (MOPS), 2-(N-morpholino)ethanesulfonic acid (MES), and combinations thereof, at a concentration in the composition providing the composition a pH from 5.9 to 8.0, and
a preservative.

3. The method of claim 2, wherein
the heavy metal salt is chromium III chloride having a concentration of 0.03 M in the composition and manganese II chloride having a concentration of 0.02 Molar in the composition;
the saccharide is fructose having a concentration of 2.6 Molar in the composition;
the aqueous buffer is 4-(2-hydroxyethyl)-1-piperazineethanesulfonic acid at a concentration in the composition providing the composition a pH from 7.0 to 7.4;
the aliphatic aldehyde is formaldehyde having a concentration of 0.1 Molar in the composition; and
the preservative is sodium azide having a concentration in the composition of 0.01% (weight/volume).

4. The method of claim 1, wherein the storing is for at least 30 days.

5. A method for stabilizing and analyzing a biological specimen post-draw, the method comprising:
contacting a biological specimen having cells of hematopoietic or non-hematopoietic origin and of a volume sufficient to conduct flow cytometry with a stabilizing composition, the stabilizing composition comprising:

a heavy metal salt, saccharide having a concentration in the stabilizing composition from 1.5 to 3.0 Molar, an aliphatic aldehyde having a concentration in the stabilizing composition from 0.001 to 0.15 Molar, a pH from 5.9 to 8.0, and a solvent;

storing the biological specimen contacted with the stabilizing composition at a temperature from minus 20 degrees Celsius to minus 200 degrees Celsius for at least 1 day to stabilize the biological specimen;

thawing the biological specimen contacted with the stabilizing composition;

staining the biological specimen contacted with the stabilizing composition;

lysing red blood cells in the biological specimen contacted with the stabilizing composition;

analyzing the biological specimen to determine the presence or absence of a condition of interest.

6. The method of claim 5, wherein the aliphatic aldehyde having has a concentration in the stabilizing composition from 0.001 to 0.1 Molar; and wherein the stabilizing composition further comprises an aqueous buffer selected from the group consisting of 4-(2-hydroxyethyl)-1-piperazineethanesulfonic acid, 3-morpholinopropane-1-sulfonic acid (MOPS), 2-(N-morpholino)ethanesulfonic acid (MES), and combinations thereof, at a concentration in the composition providing the composition a pH from 5.9 to 8.0, and a preservative.

7. The method of claim 6, wherein the heavy metal salt is chromium III chloride having a concentration of 0.03 M in the composition and manganese II chloride having a concentration of 0.02 Molar in the composition;

the saccharide is fructose having a concentration of 2.6 Molar in the composition;

the aqueous buffer is 4-(2-hydroxyethyl)-1-piperazineethanesulfonic acid at a concentration in the composition providing the composition a pH from 7.0 to 7.4;

the aliphatic aldehyde is formaldehyde having a concentration of 0.1 Molar in the composition; and the preservative is sodium azide having a concentration in the composition of 0.01% (weight/volume).

8. The method of claim 5, wherein the storing is for at least 30 days.

* * * * *